United States Patent [19]
Coiro, Sr. et al.

[11] Patent Number: 5,000,120
[45] Date of Patent: Mar. 19, 1991

[54] ANIMAL CAGING ASSEMBLY WITH A VENTILATION SYSTEM

[75] Inventors: Michael A. Coiro, Sr., Wrightstown; Dale R. Murray, Burlington Twp., both of N.J.

[73] Assignee: Allentown Caging Equipment Co., Inc., Robbinsville, N.J.

[21] Appl. No.: 426,941

[22] Filed: Oct. 25, 1989

[51] Int. Cl.$^5$ .............................................. A01K 1/00
[52] U.S. Cl. .......................................... 119/15; 119/17
[58] Field of Search ............................... 119/15, 17, 21

[56] References Cited

U.S. PATENT DOCUMENTS

| | | | |
|---|---|---|---|
| Re. 32,113 | 4/1986 | Harr | 119/15 |
| 2,702,503 | 2/1955 | Wildhaber | 119/30 |
| 3,343,520 | 9/1967 | Schwartz, Jr. | 119/15 |
| 3,919,978 | 11/1975 | Schaefer | 119/17 |
| 3,924,571 | 12/1975 | Holman | 119/15 |
| 4,085,705 | 4/1978 | Gland et al. | 119/17 |
| 4,206,720 | 6/1980 | Ruggeri et al. | 119/15 |
| 4,343,261 | 8/1982 | Thomas | 119/15 |
| 4,365,590 | 12/1982 | Ruggieri et al. | 119/15 |
| 4,402,280 | 9/1983 | Thomas | 119/15 |
| 4,480,587 | 11/1984 | Sedlacek | 119/15 |
| 4,528,941 | 7/1985 | Spanglar | 119/15 |
| 4,593,650 | 6/1986 | Lattuada | 119/15 |
| 4,640,228 | 2/1987 | Sedlacek | 119/15 |
| 4,690,100 | 9/1987 | Thomas | 119/15 |
| 4,697,547 | 10/1987 | Molestein | 119/17 |
| 4,699,088 | 10/1987 | Murray et al. | 119/15 |
| 4,798,171 | 1/1989 | Peters et al. | 119/15 |

*Primary Examiner*—Paul J. Hirsch
*Attorney, Agent, or Firm*—Mathews, Woodbridge & Collins

[57] ABSTRACT

The rack and cage combination includes a forced air ventilation system which is automatically coupled to the cage when it is placed for storage on the rack. The forced air system includes means for directing air down onto the floor of the cage whereby vapors that normally settle at the bottom of the cage are circulated vertically toward a bonnet filter. Ventilation passages are provided around the periphery of the open top under the skirt of the filter bonnet so that gases, vapors and particulate matter can freely pass out the cage. When in the static mode, wherein the cage is disconnected from the forced air source or the forced air source is not in operation, these ventilation passages will permit air, but not particles, to freely enter the cage from the macro-environment.

12 Claims, 7 Drawing Sheets

ANIMAL CAGING ASSEMBLY WITH A VENTILATION SYSTEM

FIELD OF THE INVENTION

This invention relates to an improved cage assembly for confining laboratory animals in isolation combined with a ventilation means for controlling the temperature, humidity and chemical content of the vapors in the cage interior.

DESCRIPTION OF THE PRIOR ART

Several regulating agencies have set forth stringent recommendations for tight control on air change rates temperature and relative humidity for animal housing rooms (macro-environment) but have not addressed the specific environment in which the animal actually lives, the cage (micro-environment).

Caging, historically, has been of "open" construction like chicken wire made to contain the animal but open enough to permit random air exchange with the macro-environment, e.g. see U.S. Pat. No. 4,206,720. The exchanged air in most cases contains bacterial and viral agents known to be infectious to the animals. These "open" cages afforded no protection from crosscontamination due to airborne infectious agents.

Later, the filter-bonnet cage was developed to avoid cross-contamination. The filter bonnet cage has a shoe box-type container that permits no air permeability on four sides and the bottom, but is totally open on the top. It is then covered by an air permeable filter material to prevent particles, such as airborne viable organisms, from falling or settling into the cage and causing a disease in the occupants, primarily mice and rats. Examples of filter bonnet cages may be found in the following U.S. Pat. Nos.: 3,343,520; 4,480,587; 4,699,088; 4,593,650; 4,690,100.

These systems proved to be efficacious in preventing cross-contamination. However, some of the shortcomings of these systems include a very small air change rate between the macro- and the micro-environment. The filter bonnet acts as a lid which limits outside air movement from getting into the cage and prevents many of the micro-environment pollutants (e.g. carbon dioxide, ammonia) as well as heat and humidity from getting out of the cage. These shortcomings have some serious implications to the researcher. For instance, the serological workups, particularly the blood gases, may not be valid.

Moreover, because of these problems, cage changes for conventional filter bonnet cages must be performed more frequently. To prevent viable organisms from getting into the cage at cage change time, the animals must be transferred to a fresh sterile cage in a sterile environment (normally a laminar flow bench or room) which makes the procedure even more labor intensive.

It has been found that the temperature inside the cage (micro-environment) increases as much as twenty degrees while the relative humidity will become thirty or even forty percent higher than the macro-environment. These elevated heat and humidity conditions are known to be harmful to most animals, which have only a limited mechanism for controlling their own body temperature.

Furthemore, the addition of ammonia, caused by the bacteria breaking down the animal urine, doesn't escape from the cage because the air movement outside the cage has little effect on the static air condition within the cage. In some cases, the ammonia levels have been shown to be in excess of 500 parts per million (PPM) in a cage on day ten. Thus, the combination of higher temperature, humidity, carbon dioxide, and ammonia can and does have an effect on the physiological and behavioral responses of the animal. This in turn could and often does impinge on the results of an experiment.

The early filter-bonnet cage was usually constructed of an open-top transparent box with a filter cap for biologically isolating the encaged animals in their micro-environment. The typical filter cap had a substantially rigid transparent housing that rested on and encompassed the open top of the box. A portion of the filter often included a skirt portion that overhangs the upper edge of the box to prevent the filter cap from being dislodged from the box. An air filter is normally detachably secured to the top portion of the cap that included a perforated plate to protect the filter It was intended that air from the macro-environment would pass through the filter into the cage while contaminated air passed out of the cage via the filter The filter was primarily used to prevent particulate matter, biological or otherwise, from entering the cage. The portion of the cap that encompassed the open top usually had a resting surface that was formed to engage a corresponding surface portion on the box to effect a substantial seal. U.S. Pat. No. 4,480,587 discloses a filter bonnet cage of this type. In these systems ventilation was a passive process that depended on air circulation produced by differences in temperature and pressure and gradient diffusion.

Although these early cages did serve to prevent crosscontamination, as mentioned earlier, the micro-environment was adversely effected in other respects because of the poor air circulation into and out of the cage. As such, dynamic ventilation techniques were developed whereby air was forced into the micro-environment. Some of these active ventilation techniques did not include provision for the prevention of cross-contamination. U.S. Pat. No. 4,365,590 shows a negative pressure system that draws air from an animal cage rack which contains a plurality of closely spaced, open-top cages. Clearly, in this system, particulate matter passing above the open tops could easily descend into a cage and cause contamination.

U.S. Pat. Nos. 4,085,705; 4,343,261; and RE 32,113 show dynamic ventilation systems for use with a plurality of animal cages that minimize cross-contamination In these devices, the open top of the cages are covered by the rack structure to prevent particulate matter from entering the cage while mounted thereon. Also, forced air ducts associated with the rack direct clean air into the cages. However, when a cage is removed from the rack, the open top is exposed to the macro-environment and contamination can occur.

U.S. Pat. No. 4,593,650 discloses a dynamic ventilation system which avoids this problem. In U.S. Pat. No. 4,593,650 a conventional filter-bonnet cage is modified with an auxiliary disposable sterile filter connected to a source of pressurized air so as to permit a forced circulation of air through the sterile filter and filter sheet in the filter bonnet. When the cage is removed from the pressurized air for such operations as animal manipulation and/or cage change, the system permits the static ventilation system to resume operation. Although this device has solved many of the caging problems associated with the static filter-bonnet system, it has not proved entirely satisfactory under all conditions of service for several reasons. For one, high temperatures and humidities will still occur when the cage is disconnected from the pressurized air source. Also, contaminated air can often be found in the cage even when connected to the forced air source. Further, particulate matter cannot pass out of the cage since air leaving the cage must always pass through a filter. Additionally, the cage is not easily connected to or disconnected from the air source.

Consequently, those concerned with the development of animal cages have long recognized the need for a caging system having filter-bonnet cages with improved means for the removal of heat, humidity and unwanted micro-environmental vapors while maintaining the cage free from cross-contamination both on and off the rack. The present invention fulfills this need.

SUMMARY OF THE INVENTION

The general purpose of this invention is to provide an animal caging system which embraces all of the advantages of similarly employed systems of the filter-bonnet type and possesses none of the aforedescribed disadvantages. To attain this, the present invention contemplates a unique rack and cage combination that includes a forced air ventilation system which is automatically coupled to the cage when it is placed for storage on the rack. The forced air system includes means for directing air down onto the floor of the cage whereby vapors that normally settle at the bottom of the cage are circulated vertically toward the bonnet filter. It is further contemplated that ventilation passages be provided around the periphery of the open top under the skirt of the filter bonnet so that gases, vapors and particulate matter can freely pass out of the cage. When in the static mode, wherein the cage is disconnected from the forced air source or the forced air source is not in operation, these ventilation passages 10 will permit air but not particles to freely enter the cage from the macro-environment.

Accordingly, it is an object of the present invention to provide a high-efficiency ventilated animal caging system that prevents cross-contamination.

Another object is the provision of means for increasing the amount of air exchange in both the dynamic ventilation and passive ventilation modes.

A further object of this invention is to provide a forced-air ventilation means which may be easily incorporated into present systems.

With these and other objects in view, as will hereinafter more fully appear, and which will be more particularly pointed out in the appended claims, reference is now made to the following description taken in connection with the accompanying drawings.

DETAILED DESCRIPTION OF THE PREFERRED EMBODIMENT

Figure 1:
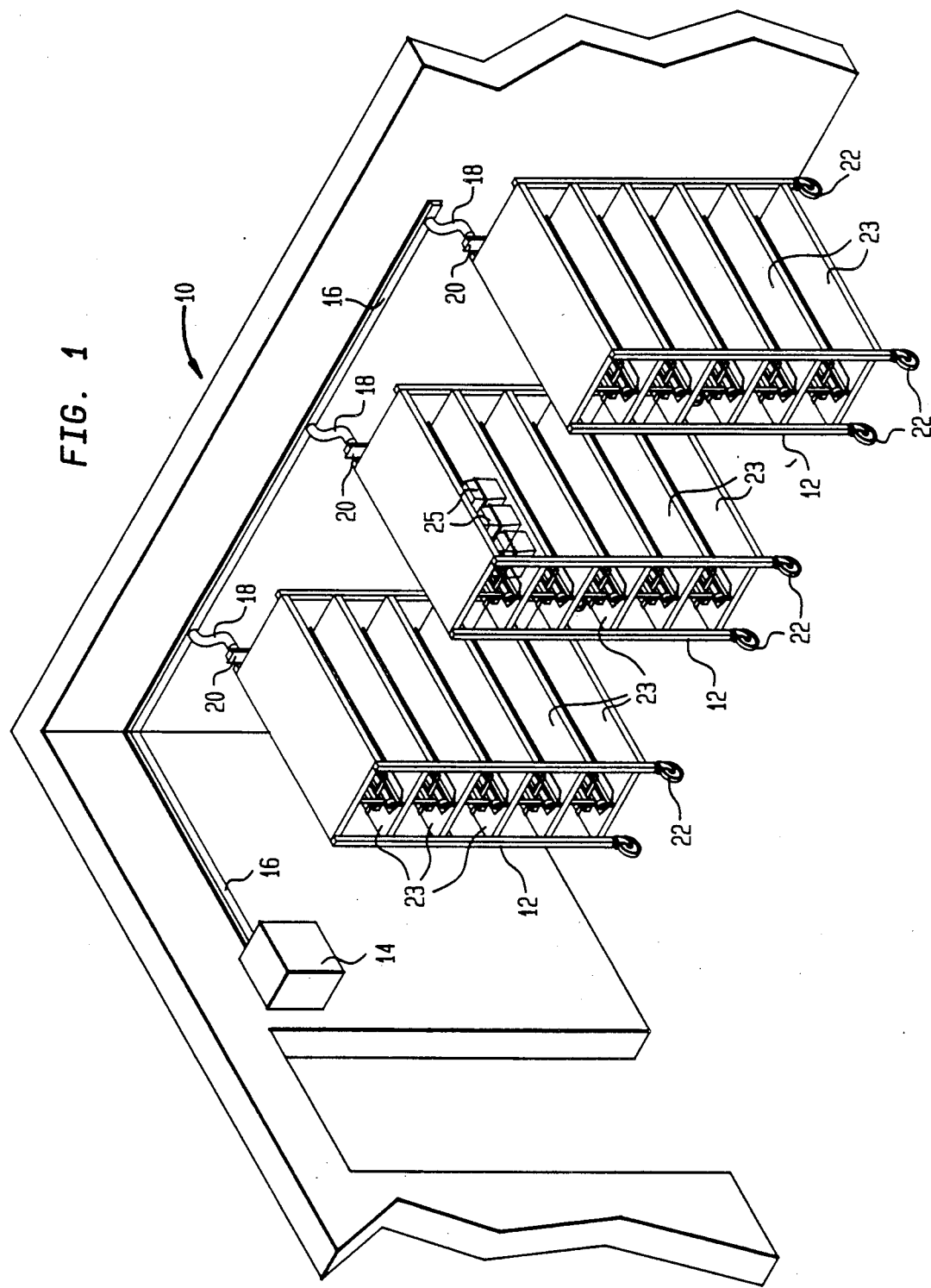
FIG. 1 is a pictorial view of the preferred embodiment.

Referring now to the drawings, there is shown in FIG. 1 an animal caging room 10 having three animal caging racks 12. A filtered high-efficiency-particulate-air (H.E.P.A.) blower unit 14 is mounted on one of the walls of room 10. A main air plenum 16, mounted on the room walls, extends from the unit 14 along a line adjacent to the location of racks 12. Flexible air ducts 18 are joined at one end to spaced points on plenum 16 and at the other end to a vertical air supply plenum 20 mounted on each of the racks 12. As such, the plenum 16 and ducts 18 function as a filtered H.E.P.A. distribution system for the caging room 10.

Each of the racks 12 is portable, being mounted on casters 22. The racks 12 include vertical frames on which are mounted a plurality of sheet metal shelves 23 for holding a plurality of animal isolation cages 25 in side-by-side and back-to-back positions. Cages 25 may be placed onto shelves 23 from either side of rack 12. Of course, the shelves 23 may be designed to receive the cages 25 from only one side and to hold the cages 25 in only a side-by-side relationship.

Figure 2:
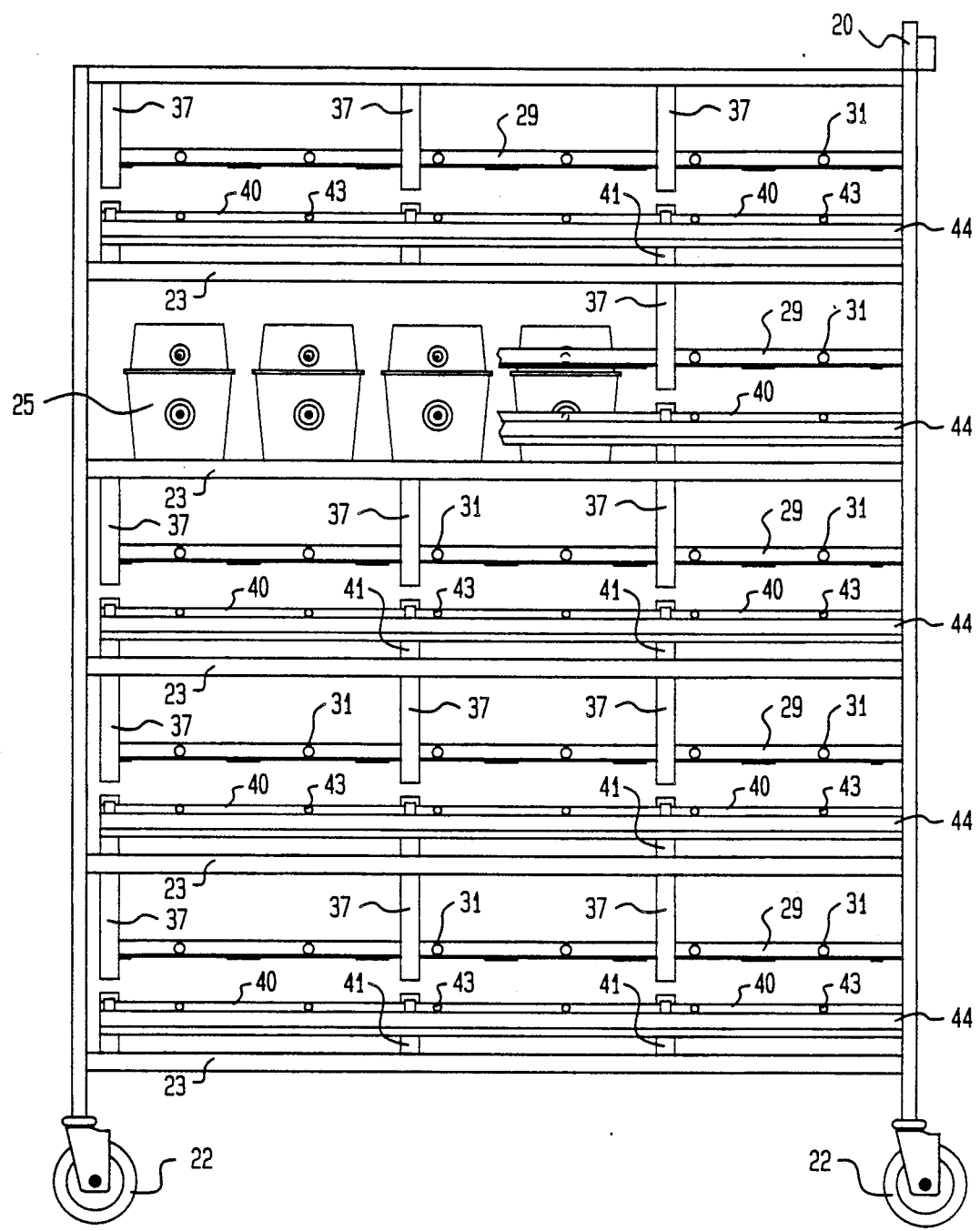
FIG. 2 is a front elevation, with parts broken away, of a portion of the system shown in FIG. 1.
Figure 3:
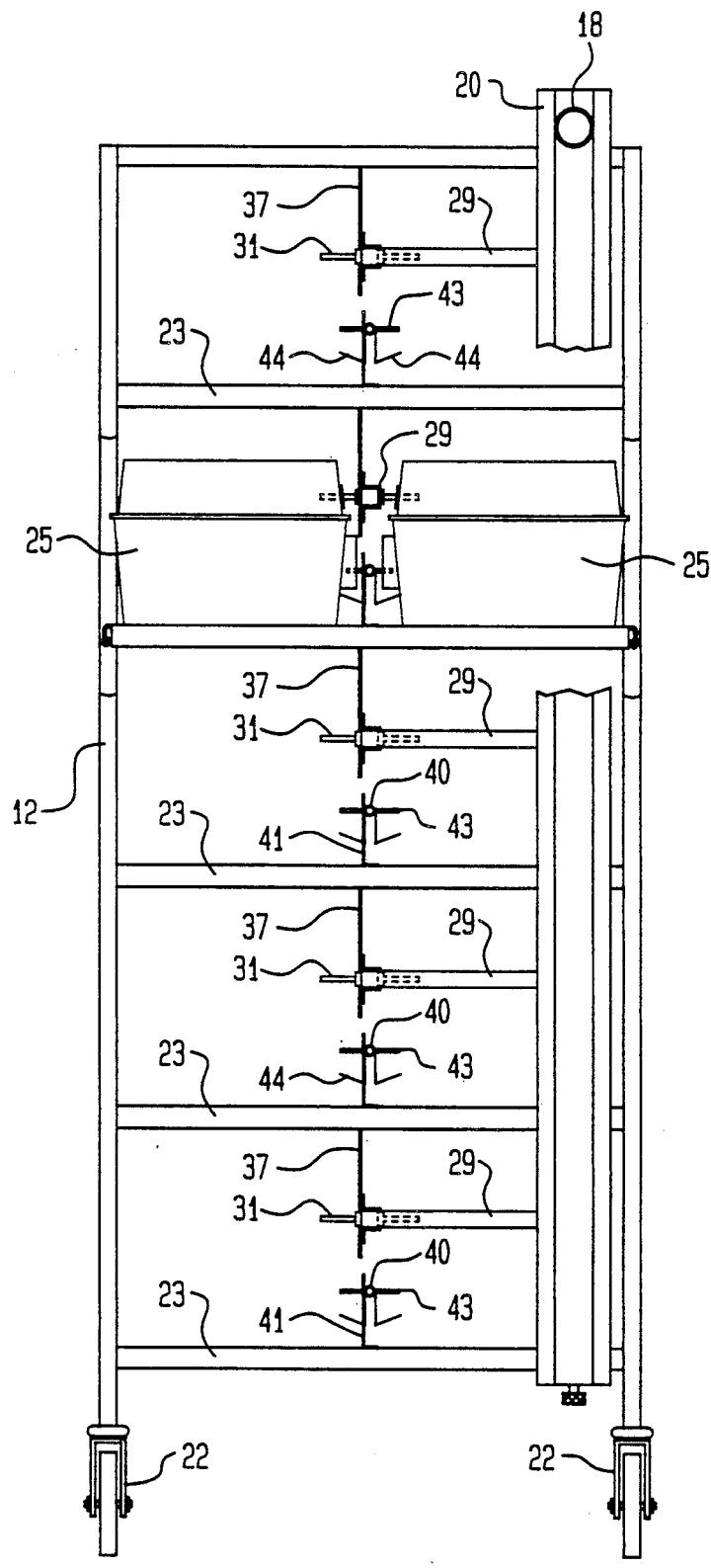
FIG. 3 is a side view, with parts broken away, of the apparatus shown in FIG. 2.
Figure 4:
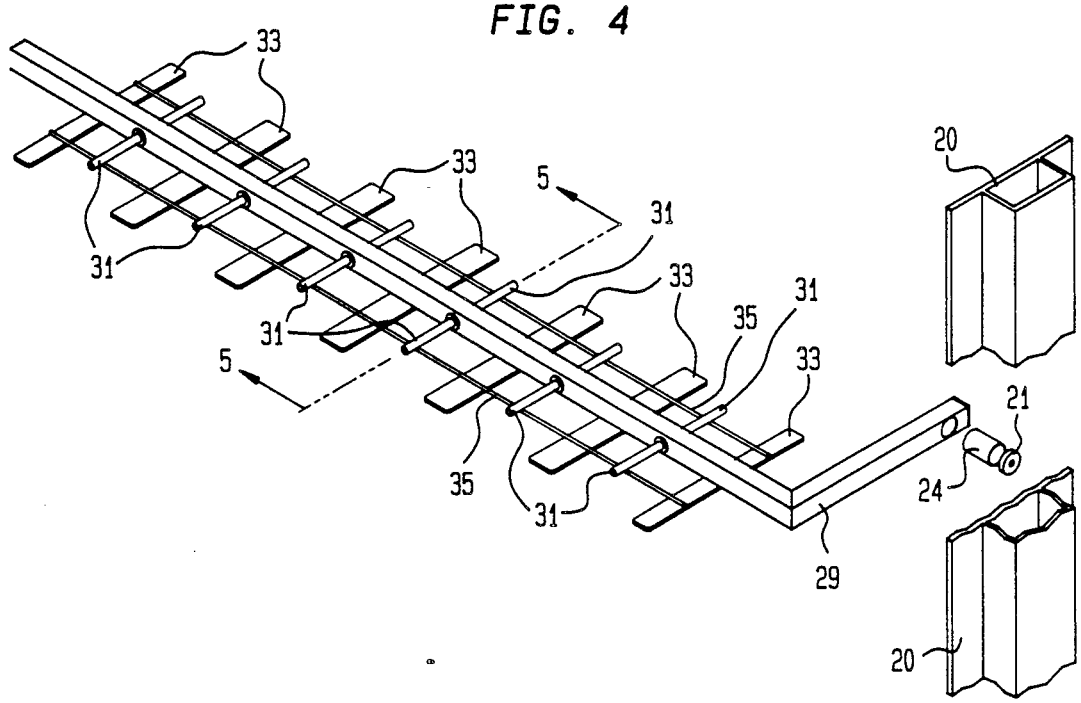
FIG. 4 is a pictorial view of a detail of the apparatus shown in FIGS. 2 and 3.
Figure 5:
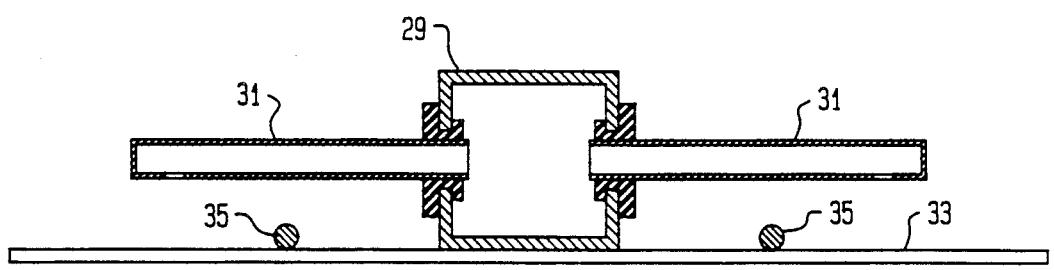
FIG. 5 is a sectional view of the device shown in FIG. 4 taken on a line 513 5 and looking in the direction of the arrows.
Figure 6:
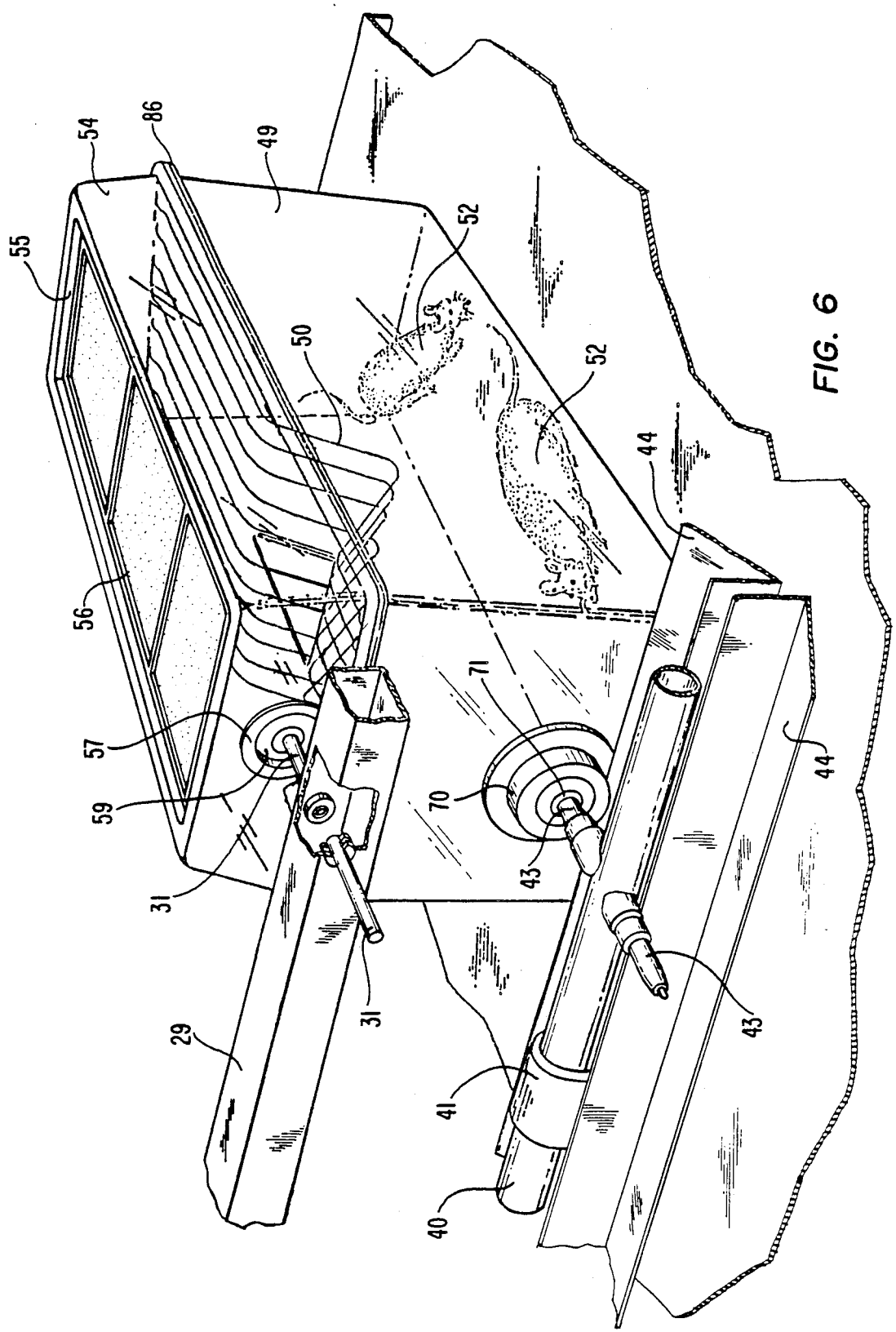
FIG. 6 is a pictorial view of a broken-away detail of the preferred embodiment.
Figure 7:
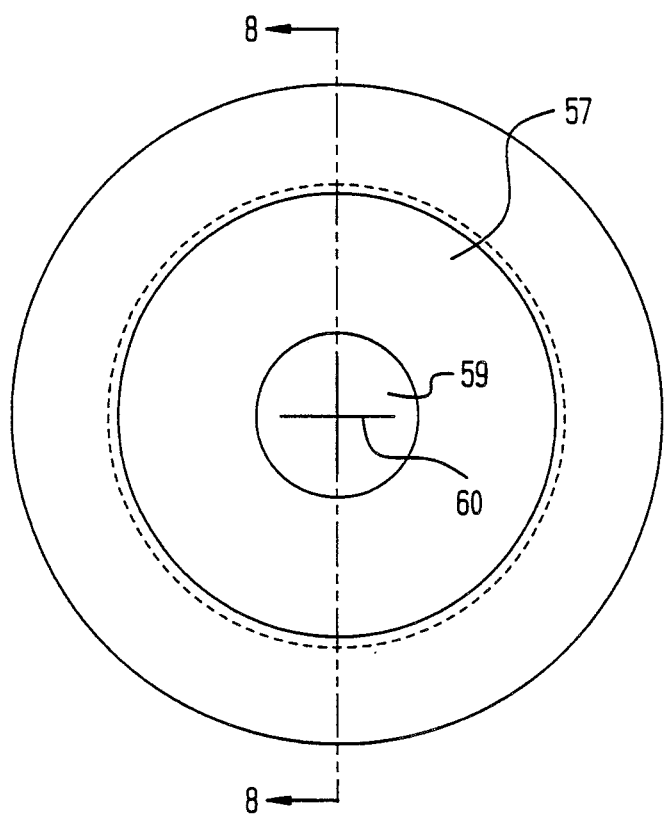
FIG. 7 is a front view of a detail of the device shown in FIG. 6.
Figure 8:
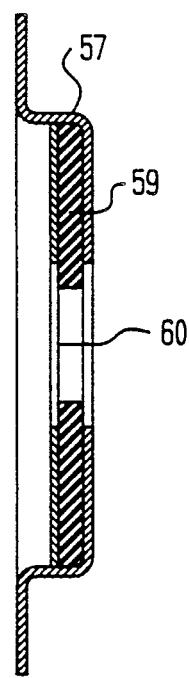
FIG. 8 is a cross-sectional view taken on the line 8—8 of FIG. 7 looking in the direction of the arrows.

When assembled as shown in FIG. 1, the filtered H.E.P.A. blower unit 14 supplies filtered air from the macro-environment of room 10 to the micro-environment defined by the interior of isolation cages 25. As seen in FIGS. 2 and 3, the plenum 20 extends vertically along the side of the rack 12 and may be fixed to the folded edges of the sheet metal shelves 23. The plenum 20 is joined to horizontal air supply lines 29 to define an air manifold system for distributing filtered H.E.P.A. from the plenum 16 to the individual cage positions on rack 12.

Each of the supply lines 29 is coupled to the plenum 20 with a transition tube 24 containing a flow restrictor orifice 21 for establishing an appropriate air flow to lines 29. The lines 29 extend horizontally along the center of the rack 12 above the surface of the shelf 23. At spaced locations along the line 29 there are individual cage air supply tubes 31 extending horizontally on opposite sides of line 29 into the cage positions that are defined by a plurality of spaced cage separator plates 33 which may be welded or otherwise fixed to the underside of the lines 29. Cage stop rods 35 are fixed to the upper surface of plates 33 and are parallel to and spaced on either side of line 29. The lines 29 are suspended by spaced hanger brackets 37 from shelves 23.

A conventional water supply line 40 is supported by brackets 41 just below lines 29. Conventional on-demand watering valves 43 extend from the water supply lines 40 to extend into the cage positions about midway between the separator plates 33 V-shaped water troughs 44 are mounted on brackets 41 just below the valves 43 for the purpose of catching any leaking water that may be the result of a malfunctioning valve 43.

The isolation cage 25 comprises the following: a transparent polycarbonate cage 49 having a bottom wall, four side walls and an open top; a stainless steel wire bar lid 50 mounted over the open top for constraining the animals 52 inside the cage 49; and a transparent polycarbonate filter top assembly 54 mounted over the lid 50 and having apertures 55 with a filter 56 mounted thereon to permit air, and not particles, to pass into and out of the cage interior. The rear surface of the top assembly 50 contains an air access port 57 having a flexible disk 59 with cross-cut slits 60 for receiving the air supply tubes 31. The rear surface of the cage 49 includes a conventional watering manifold 70 which has a flexible disk 71 with cross-cut slits 72 for receiving valves 43, as shown in phantom in FIG. 9. A water removal perforation 75 is located on the bottom surface of manifold 70 for permitting any spilled water to drain into the trough 44. The stop rods 35 are placed such that the tubes 31 and the valves 43 extend the appropriate distances into cages 25 when they abut the rods 35

Figure 9:
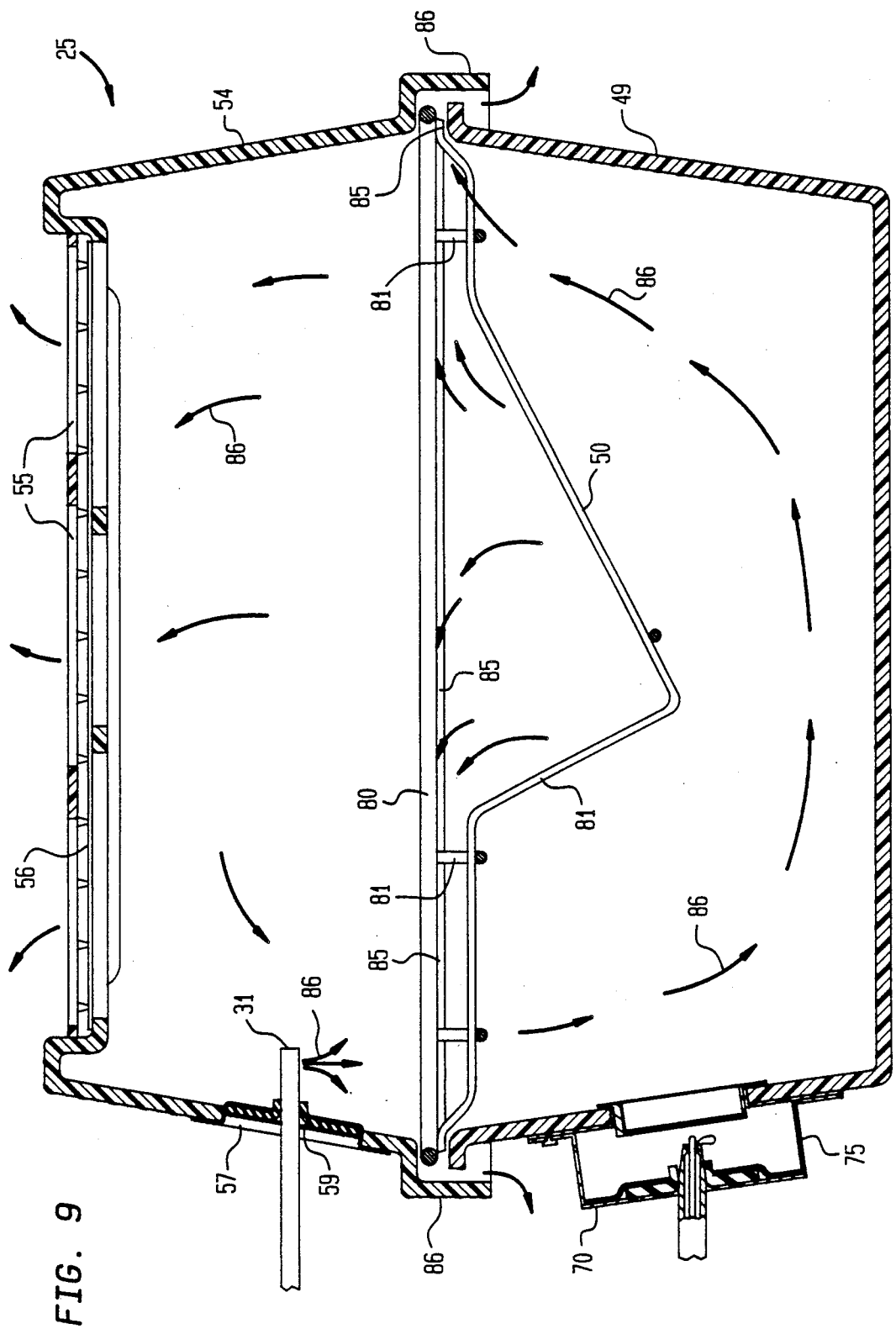
FIG. 9 is a cross-section of the isolation cage shown in FIG. 6.

As seen in FIG. 9, the lid 50 includes an upper wire frame 80 having a plurality of cross elements 81 connected thereto to form the appropriate lid configuration. The ends of elements 81 are fixed to the undersurface of frame 80. With the lid 50 mounted on the cage 49, the elements 81 rest on the upper periphery of cage 49, thereby defining a series of peripheral openings 85 between the frame 80 and the upper edge of the cage 49. The assembly 54 includes a peripheral lower skirt 86 that extends over the frame 80 to a point below the openings 85.

With particular reference to FIG. 9, air circulation in an isolation cage 25 that is mounted on a rack 12 is depicted by the arrows 86. The filtered H.E.P.A. is directed downwardly with moderate velocity by the air supply tube 31. As such, there will be a positive pressure in the cage 25 which will result in air being exhausted from the cage 25 primarily via the openings 85. Additionally, some air will also pass from cage 25 through the filter 56, the perforation 75, and the small openings that may exist between the disks 59, 71 and the tubes 31, 43, respectively. As seen in FIG. 9, the air circulation in the cage 25 is such that air is directed at the floor of the cage 49 so as to insure the removal of unwanted vapors from the specific animal living quarters. Hence, there will be an upward circulation of air from the animal living quarters towards the openings 85, the filter 56 and other points of air exhaust.

When the isolation cage 25 is removed from the rack 12, the animals 52 will remain in isolation while a significant amount of cage ventilation will continue to take place. Ventilation is made possible because the openings 85 will permit air to enter and exit the cage 25. Air may also enter and exit cage 25 via the filter 56 and the perforation 75. Also, while particles may escape from the cage 25, no particles can enter the cage 25. The filter 56 will prevent particles from entering cage 25 in the conventional manner. Because the skirt 86 extends below the openings 85, particles will be prevented from entering the cage 25 at this location. Additionally, the perforation 75 is located at the bottom of water manifold 70 and below the water access opening, thereby preventing the entrance of particles into cage 25 through this opening.

The filter 56 may be a replaceable Reemay 2024 filter insert. The port 57 is preferably constructed of 22 gauge stainless steel about 1.75 inches in diameter. Disk 59, preferably made of silicone, may be 0.062 inches thick and 1.187 inches in diameter with crosscut slits 60 about 0.375 inches in length. The racks 12, plenum 20, lines 29 and shelves 23 are preferably made of stainless steel.

The blower unit 14 is preferably a sealed, self-contained cabinet that includes conventional items such as a pre-filter, electric motor and fan, H.E.P.A. filter, on/off control switch with an indicator light, and a pressure drop gauge. The gross particulate pre-filter, accessible from the exterior, is preferably of the disposable pleated-media type with a light-weight rigid frame. It should be mounted to prevent any airborne particles from bypassing the pre-filter.

The blower motor and fan assembly preferably includes a continuous duty, shaded pole blower, specifically designed to provide a sufficient volume of air for the number of racks 12 required. The blower unit 14 should preferably be securely mounted so as to provide minimum noise and vibration A H.E.P.A. filter that functions at 99.997% efficiency for airborne particulate of 0.3 microns in diameter, or greater is contemplated.

The blower unit 14 should provide for a smooth and even flow of air drawn from the room 10, through the pre-filter and into the unit 14. The air may pass through the fan and be directed to the H.E.P.A. filter under positive pressure There may be a preset damper controlled flow balancing duct between the negative side of the fan (pre-filter to fan area) and the positive side of the fan (fan to H.E.P.A. filter area) The air, under positive pressure, will then be forced through the H.E.P A. filter to the area between the H.E.P.A. filter and the plenum 16.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. An animal caging system comprising:
   a plurality of animal cage holding racks;
   a plurality of animal isolation cages mounted on said racks, each having an air port therein and each including a box having an open top, a filter bonnet having a skirt that overlaps the periphery of said open top, and a wire lid extending across said open top and mounted between said skirt and the periphery of said open top, wherein said wire lid defines openings that extend from the interior of said cage to the exterior of said cage under said skirt;
   a filtered H.E.P.A. blower;
   a main air manifold means for distributing air from said blower to a plurality of spaced output locations;
   a rack air manifold means mounted on each of said racks wherein each said air rack manifold means has an input coupled to said main air manifold means and a plurality of outputs with each output having an air tube extending into a cage via said air ports, for distributing air from said main manifold means to said cages for producing positive pressure therein; and
   sealing means mounted in each said port for closing said port when said cage is removed from said rack, and for opening said port to permit the entrance of air into said cage via said air tube, and for forming a seal with said air tube to prevent the entrance of particles into said cage when it is mounted on said rack and positive pressure is in said cage.

2. The system of claim 1 further including a water manifold means mounted on said box for permitting water to be accessed therein.

3. The system of claim 2 wherein said animal cage holding racks include a plurality of spaced dividers extending between said cages.

4. The system of claim 1 wherein each said rack air manifold means includes a plenum and a plurality of air supply lines mounted on said rack, each said air supply line connected to said plenum via an air flow restriction orifice, said air tubes communicating with said air supply lines at spaced locations thereon.

5. The system of claim 4 wherein each said air tube has at least one air exit opening facing downwardly for directing air at the lower portion of said box.

6. The system of claim 5 wherein each said rack has rollers thereon and flexible ducts with each said duct connecting said main air manifold to one of said plenums to permit said racks to be moved on said rollers with respect to each other and said main air manifold while said filtered H.E.P.A. blower is supplying air to said cages.

7. The system of claim 1 wherein said sealing means includes a resilient disk extending across said port with a slit cut therein for permitting said air tube to extend through said slit while forming a seal between said disk and said tube, and wherein said disk closes said air port when said tube is removed from said slit.

8. An animal caging assembly comprising:
a source of pressurized air;
an animal cage holding rack;
an air manifold means mounted on said rack having a plurality of air supply pipes mounted at spaced locations on said rack for providing pressurized air from said source to said air supply pipes;
a plurality of animal isolation cages mounted on said rack at said spaced locations, each said cage including:
a box having a bottom wall, side walls, and an open top;
a grated lid extending across the open top, said lid having a periphery resting on said side walls;
a filter bonnet extending over said lid and having a peripheral skirt that rests on said lid and extends down over said lid and a portion of said side walls, and wherein said lid, side walls and skirt form peripheral openings that extend from the interior of said cage, past said lid and under said skirt to the exterior of said cage; and
an air supply port formed in said cage having sealing means for slidably engaging one of said air supply pipes when said cage is mounted on said rack and when said pipe extends through said air supply port, and for closing said air supply port when said cage is removed from said rack and said pipe is removed from said air supply port,
whereby the interior of said cages, when said cages are mounted on said rack, are ventilated by air from said source via said manifold and said air supply pipe while being isolated from the ambient air, and, when said cages are removed from said rack, are ventilated by said ambient air said filter bonnet and said peripheral openings while being isolated from ambient particles.

9. The system of claim 8 wherein said source of pressurized air includes a filtered H.E.P.A. blower.

10. The system of claim 9 wherein said air manifold means includes a plenum and a plurality of air supply lines mounted on said rack, each said air supply line connected to said plenum via an air flow restriction orifice, said air supply pipes communicating with said air supply lines at spaced locations thereon.

11. The system of claim 10 wherein each said air pipe has at least one air exit opening facing downwardly for directing air at said bottom wall.

12. The system of claim 9 wherein said sealing means includes a resilient disk extending across said air supply port with a slit cut therein for permitting said air supply pipe to extend through said slit while forming a seal between said disk and said pipe, and wherein said disk closes said air supply pipe when said pipe is removed from said slit.

* * * * *